May 7, 1957
W. RUF
2,791,438
VEHICLE WITH SEPARATE STEERING MEANS FOR
THE FRONT AND REAR SETS OF WHEELS
Filed July 2, 1954
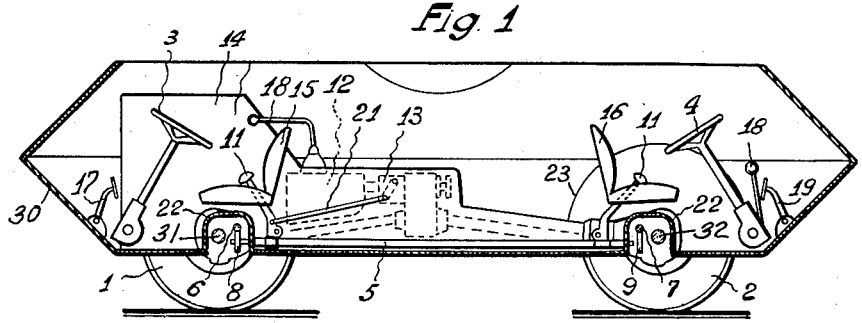
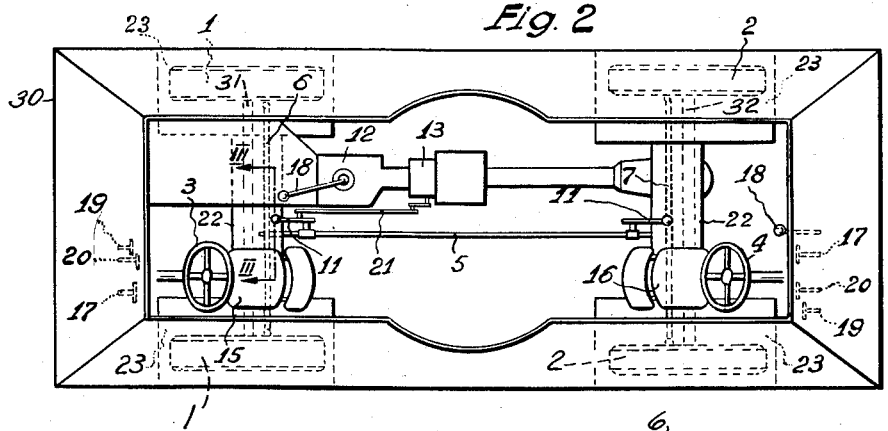
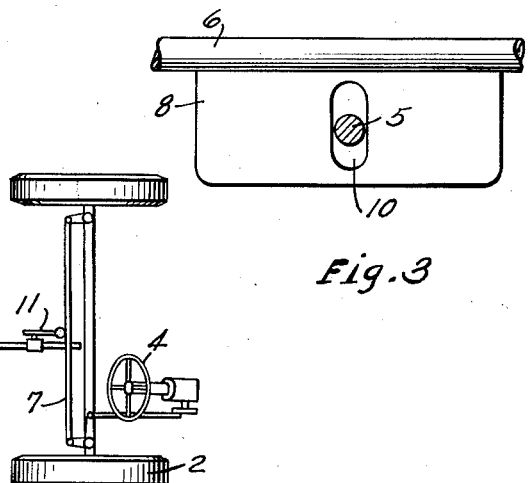
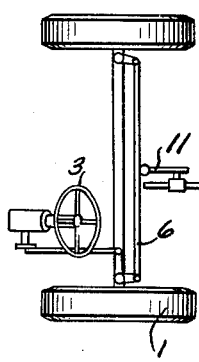

United States Patent Office 2,791,438
Patented May 7, 1957

2,791,438

VEHICLE WITH SEPARATE STEERING MEANS FOR THE FRONT AND REAR SETS OF WHEELS

Walter Ruf, Landhaus am See, Bottighofen, Switzerland

Application July 2, 1954, Serial No. 441,074

Claims priority, application Switzerland July 3, 1953

3 Claims. (Cl. 280—91)

The present invention relates to a motor vehicle or armored vehicle having wheels provided with pneumatic tires, and more particularly to a motor vehicle wherein both the fore and aft wheels may be steered and controlled independently of each other.

In accordance with the present invention, a motor vehicle or armored vehicle having wheels provided with pneumatic tires is provided with a separate steering mechanism for the fore and the aft wheels. The present invention also contemplates the provision of separate locking mechanism for locking either the fore or the aft wheels, which locking mechanism is only operable to lock the wheels when in a neutral position or a position having no steering deflection.

An object of the present invention is to provide a vehicle having improved maneuverability.

Another object of the present invention is to provide a vehicle especially well adapted for moving backwards.

Yet another object of the present invention is the provision of a vehicle in which the fore and aft wheels can be steered independently of each other.

Yet another object of the present invention is the provision of an improved motor vehicle of the above character which is of simple design and construction, economical to manufacture, and highly efficient in the accomplishment of its intended purpose.

Other objects, advantages and nature of the invention will be more fully understood from the following description of the preferred embodiment of the invention, shown by way of example, in the accompanying drawings in which:

Fig. 1 is a longitudinal sectional view of the motor vehicle;

Fig. 2 a plan view of a lightly armored military vehicle;

Fig. 3 a detail sectional view taken on the line III—III in Fig. 2; and

Fig. 4 shows the steering linkage and interlocking control.

Referring now more particularly to Figs. 1 and 2, in which similar characters of reference indicate corresponding parts, and which illustrate the presently preferred mode of practicing the invention, the numeral 30 indicates the body of a motor vehicle or of an armored motor vehicle. As shown, the vehicle 30 is provided with a fore axle 31 and an aft axle 32, a reciprocating engine 14 and four pneumatically tired drivable wheels, comprising a pair of front wheels 1 journaled on axle 31 and a pair of rear wheels 2 journaled on axle 32. A separate steering mechanism including a steering wheel 3 is provided for the front wheels 1, and another separate steering mechanism including steering wheel 4 is provided for the rear wheels 2. In this manner, the vehicle 30 becomes quite maneuverable since it can be steered with either the front wheels 1 or with the rear wheels 2 as desired or, if necessary, a steering deflection can be given to both pairs of wheels 1 and 2 simultaneously.

In the illustrated vehicle 30, a locking device or mechanism is provided which enables the steering mechanism for the front wheels 1 or for the rear wheels 2 to be locked as desired. For this purpose, the locking device or mechanism generally comprises a locking bar 5 which can be displaced in a longitudinal direction relative to the vehicle 30 which is provided with and can secure track or tie rods 6 and 7 for guiding the respective pair of front wheels 1 and rear wheels 2 against lateral displacement. Track or tie rods 6 and 7 are provided with and have respectively attached thereto lugs which are each provided with vertical slots 10 into which the respective ends of locking bar 5 can be engaged. Since lugs 8 and 9 have a definite width, locking bar 5 can only be displaced when slots 10 are in registry with and aligned with bar 5. As best seen in Fig. 3, slots 10 are elongated and substantially oval in shape in order to allow relative vertical movement between track or tie rods 6 and 7 on the one hand and locking bar 5 carried on the chassis of the vehicle 30 on the other hand, which movements occur in consequence of the springing of the wheels 1 and 2 with respect to the other parts of the vehicle 30.

Vehicle 30 includes hand levers 11 in order to provide for the displacement of locking bar 5 so that one of the two ends of locking bar 5 becomes engaged in slot 10 of the respective lug 8 or 9. It is pointed out that locking of the steering mechanism is only possible when the front wheels 1 and the rear wheels 2 are in alignment, a position where said wheels have no steering deflection.

Vehicle 30 is provided with a transmission or a change-speed gear 12 including a range of gears for providing the requisite forward speeds for intended operation and may include a range of gears for intended reverse operation, all relative to each steering mechanism.

In addition to the change-speed gear 12 vehicle 30 is provided with a reversible change-over gear 13 in order to provide the various reduction steps for both directions of travel 13. Now the locking bar 5 of locking device is coupled to the change-over gear 13 in such a way that the steering of the wheels situated at the rear of vehicle 30 with respect to the direction of travel is locked, while only the wheels situated at the front with respect to vehicle 30 are steerable. One of the handlevers 11 is connected to the reversible change-over gear 13 by means of a bar 21 and thus serves at the same time for reversing the change-over gear. The other handlever 11 also can reverse the change-over gear 13. As the change-speed gear 12 is further equipped with the reverse gear, so that the vehicle 30 can also be operated in such a way that the steering wheel and its associated steerable wheels are to the rear with respect to the direction of travel.

Vehicle 30 also includes driver's seats 15 and 16 associated with steering wheels 3 or 4, respectively, associated with each driver's seat 15 and 16 is the necessary control members such as clutch or gear coupling pedal 17 and gearshift lever 18, fuel regulating or gas pedal 19, foot brake 20 and the like, in order to be able to manipulate also the transmission or change-speed gear 12, the engine speed and the brakes, respectively. Each foot brake pedal 20 acts directly on a hydraulic braking cylinder, whereas the other control members are connected to the motor by means of Bowden cables or suitable linkage.

In this manner, the operation of vehicle 30 can be changed-over for one or other direction of travel simply by changing over the handlever 11, whereby the vehicle 30 has equally good traveling or running qualities in both directions of travel, since different speed steps are adjustable. It is possible to adjust handlevers 11 and their associated change-over gear 13 so that only the wheels situated at the front with respect to the direction of travel are steerable by means of their steering wheel and have the wheels situated at the rear set straight and held securely in that position.

The illustrated vehicle 30 may be provided with armor comprising obliquely set armored plates and is very suitable, for instance, for carrying a built-in anti-tank defense gun, which is preferably mounted so that it can be lowered into a position within the armored plates of the vehicle 30. The chassis of the vehicle 30 is formed from a sheet-metal flooring provided with transverse bulgings 22 serving for strengthening and for taking the wheel axles 31 and 32, and of sheet-metal wheel casings 23 rigidly connected to this flooring. Armor and chassis are united to form a self-supporting, very stable and relatively light armored body, in which sufficient room is also available for ammunition and an operating crew.

While there has been described what is at present considered to be the preferred embodiment of this invention, it will be obvious to those skilled in the art that various changes and modifications may be made therein without departing from the scope of the invention as defined by the subjoined claims.

What I claim and desire to secure by Letters Patent is:

1. In a motor vehicle having wheels provided with pneumatic tires, comprising a pair of front wheels and a pair of rear wheels relative to a particular direction of travel of the motor vehicle and each pair steerably mounted on said vehicle, a first steering mechanism provided for said front pair of wheels and a second steering mechanism provided for said rear pair of wheels, said first and second steering mechanisms being independent of each other and being adapted for steering only their associated pair of wheels, and a locking device for determining whether said first steering mechanism, said second steering mechanism or both said first and second steering mechanisms are operable to steer their associated wheels, a tie rod for each of said pairs of wheels, each tie rod being provided with a lug having an aperture extending therethrough, said locking device comprising a rod mounted on said vehicle in alignment with said apertures when said wheels are in parallel relation to the longitudinal axis of the vehicle and movable in a longitudinal direction relative to said vehicle and selectively engageable with the apertures in said lugs for securing said tie rods against lateral displacement, thereby preventing the pair of wheels associated with the lug in which the rod is engaged from having a steering deflection imparted thereto, said last-named rod having an effective length which is less than the distance between said apertures when said wheels are in said last-mentioned position to thereby lock one pair of wheels at a time against steering or deflection thereof, and the locking of said steering mechanisms being possible only when their associated wheels are in a position having no steering deflection.

2. Motor vehicle according to claim 1, further including a hand lever for moving said longitudinally movable locking rod.

3. Motor vehicle according to claim 1, wherein the apertures in said lugs are vertical slots for permitting vertical relative movements between said tie rod and said longitudinally movable locking rod occurring in consequence of the springing of the said wheels with respect to the other parts of said vehicle.

References Cited in the file of this patent
UNITED STATES PATENTS

| | | |
|---|---|---|
| 1,289,296 | Stebbins et al. | Dec. 31, 1918 |
| 1,308,315 | Wilcox | July 1, 1919 |
| 1,544,775 | Plocek | July 7, 1925 |

FOREIGN PATENTS

| | | |
|---|---|---|
| 298,422 | Germany | Oct. 14, 1919 |
| 148,365 | Great Britain | Nov. 25, 1920 |